US009617170B2

(12) United States Patent
Karpova et al.

(10) Patent No.: US 9,617,170 B2
(45) Date of Patent: Apr. 11, 2017

(54) WATER TREATMENT

(71) Applicant: Kemira Oyj, Helsinki (FI)

(72) Inventors: Tatjana Karpova, Espoo (FI); Esa Melin, Ojakkala (FI); Antti Vuori, Helsinki (FI); Ulrik Ojstedt, Ramlosa (SE); Robin Gramstad, Lund (SE); Kaj Jansson, Tampere (FI); Marko Kolari, Vantaa (FI)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 14/516,174

(22) Filed: Oct. 16, 2014

(65) Prior Publication Data
US 2015/0034566 A1    Feb. 5, 2015

Related U.S. Application Data

(63) Continuation of application No. PCT/EP2013/058222, filed on Apr. 19, 2013.

(30) Foreign Application Priority Data

Apr. 20, 2012  (EP) .................................... 12164979
Sep. 5, 2012  (SE) ..................................... 1250990

(51) Int. Cl.
| | | |
|---|---|---|
| *C02F 1/32* | (2006.01) | |
| *C02F 1/72* | (2006.01) | |
| *C02F 101/30* | (2006.01) | |
| *C02F 101/36* | (2006.01) | |
| *C02F 101/32* | (2006.01) | |
| *C02F 101/34* | (2006.01) | |
| *C02F 101/38* | (2006.01) | |

(52) U.S. Cl.
CPC .................. *C02F 1/32* (2013.01); *C02F 1/72* (2013.01); *C02F 1/722* (2013.01); *C02F 2101/30* (2013.01); *C02F 2101/305* (2013.01); *C02F 2101/306* (2013.01); *C02F 2101/32* (2013.01); *C02F 2101/34* (2013.01); *C02F 2101/36* (2013.01); *C02F 2101/38* (2013.01); *C02F 2101/40* (2013.01); *C02F 2303/04* (2013.01); *C02F 2305/02* (2013.01)

(58) Field of Classification Search
CPC .......... C02F 9/00; C02F 1/32; C02F 2303/04; C02F 1/444; C02F 1/722; B01D 61/147
USPC ......... 210/748.01–748.1; 422/28, 286, 286.3
See application file for complete search history.

(56) References Cited

U.S. PATENT DOCUMENTS

| | | | |
|---|---|---|---|
| 5,139,679 A | | 8/1992 | Pan et al. |
| 5,736,057 A | * | 4/1998 | Minotti ........................ 210/759 |
| 6,558,622 B1 | * | 5/2003 | Malchesky ..................... 422/28 |
| 2007/0163966 A1 | | 7/2007 | Hilgren et al. |
| 2007/0260109 A1 | * | 11/2007 | Squillace ........................ 600/36 |
| 2009/0032471 A1 | * | 2/2009 | Borg ............................. 210/650 |
| 2010/0176066 A1 | * | 7/2010 | Budde et al. ............... 210/748.1 |
| 2011/0024361 A1 | * | 2/2011 | Schwartzel et al. .......... 210/739 |
| 2013/0220941 A1 | * | 8/2013 | Kekko et al. .............. 210/748.1 |

FOREIGN PATENT DOCUMENTS

| | | |
|---|---|---|
| CN | 101077816 | 11/2007 |
| EP | 231632 A2 * | 8/1987 |
| EP | 0543112 | 5/1993 |
| EP | 2653448 A1 * | 10/2013 |
| WO | WO 02/054866 | 7/2002 |
| WO | WO 2012/004772 | 1/2012 |
| WO | WO 2012/028778 | 3/2012 |

OTHER PUBLICATIONS

International Search Report for corresponding international application PCT/EP2012/058222.
R. Gehr, et al. "Performic acid (PFA): tests on an advanced primary effluent show promising disinfection performance", Water Science & Technology, vol. 59, No. 1, Jan. 2009, pp. 89-96.
Caretti et al., "Wastewater disinfection with PAA and UV combined treatment: a pilot plant study," Water Research 37(2003), 2365-3271.
Batlle, J. et al. "Desinfix and UV light for reclaimed water disinfection: a comparative assessment in Molina de Segura WWTO". In: 8th IWA International Conference on Water Reclamation & Refuse [online], Sep. 26-29, 2011, Barcelona, ES.
Karpova, T. et al. "Organic Peracids for Advanced Wastewater Treatment". In: Kemira's posters for water treatment solutions at Singapore International Water Week available [online], Jul. 3, 2012.
Gagnon, C. et al. "Degradation of selected acidic and neutral pharmaceutical products in a primary-treated wastewater by disinfection processes". In: Ozone: Science and Engineering, 2008, vol. 30, nr. 5, s. 387-392.
Koivunen, J. "Inactivation of enteric microorganisms with chemical disinfectants, UV irradiation and combined chemical/UV treatments," Water Research 39 (2005) 1519-1526.
Patent Office Communication for European Patent Application No. 13717290.4, issued Jun. 24, 2016.

* cited by examiner

Primary Examiner — Walter D Griffin
Assistant Examiner — Cameron Allen
(74) Attorney, Agent, or Firm — King & Spalding

(57) ABSTRACT

The present invention relates to a process for reduction of the presence of microorganisms and/or decomposition of organic micropollutants in water using an energy source and an additive characterized in that the energy source is UV radiation and the additive comprises performic acid.

8 Claims, No Drawings

WATER TREATMENT

CROSS REFERENCE TO RELATED APPLICATIONS

This application is a continuation of International Application No. PCT/EP2013/05822, filed Apr. 19, 2013, which claims priority to Swedish Patent Application No. 1250990-7, filed Sep. 5, 2012 and European Patent Application No. 12164979.2, filed Apr. 20, 2012.

TECHNICAL FIELD

The present invention relates to a treatment of water to decompose organic micropollutants and/or to enhance disinfection by reducing the presence of microorganisms, including bacteria, viruses and fungi, and decomposition of organic micropollutants.

BACKGROUND

At present, the use, and thereby the need, of purified water is growing rapidly around the world. Efforts are being made to produce pure water from less pure water than before using less chemicals, without, however, considerably raising the cost of the purification process. In addition, there is a need for the use of biodegradable or otherwise less harmful chemicals, and also chemicals which would not form compounds having detrimental health effects. Purification of raw water to produce drinking water normally includes mechanical filtration, usually biological processing, and adding the water purifying chemicals in different steps of the purification process to enhance the purification and/or to oxidize the organic and inorganic matter and organisms.

Chlorination is traditionally used to disinfect waste water. Chlorination is quite effective against bacteria, but has lower efficiency against for example viruses. In addition, chlorination gives rise to potentially toxic and mutagenic by-products, which has lead to the decrease in of chlorination as disinfection method.

Ozonation may be used to disinfect waste water. Many municipal drinking water systems kill bacteria with ozone instead of the more common chlorine. Ozone also has a very high oxidation potential. Ozone has also the ability to remove solids from wastewater by oxidation and followed by physical floatation.

Ozon sever carbon-carbon bonds and may be used to decompose organic material. Even low concentrations of ozone may be destructive to organic materials.

Activated carbon comprises small, low-volume pores that increase the surface area available for adsorption or chemical reactions. Activated carbon is used in many applications, e.g. water purification and sewage treatment, where it may be used to trap unwanted impurities.

UV-radiation has become an increasingly popular method for disinfection of water due to it being an environmentally friendly, non-chemical method. However, using UV-radiation at conventional levels often is not effective enough for reducing the level of microorganisms to acceptable levels/levels required by the authorities. To meet these requirements, users need to invest large sums in more UV-radiation capacity or in increased frequency of cleaning and/or exchange of UV-lamps.

Enteric viruses are viruses that can multiply in the gastrointestinal tract of humans or animals. More than 140 enteric viruses are known to infect humans, including viruses causing common gastrointestinal illness, hepatitis, meningitis, poliomyelitis and non-specific febrile illness. In addition, some enteric viruses have also been associated with chronic diseases, for example diabetes mellitus and chronic fatigue syndrome.

Current water disinfection processes are only able to reduce the amount of enteric viruses in the water by using high doses of chemicals.

Apart from using quite costly additives, large amounts of additives and/or not so very environmental friendly chemical additives, the known methods used for the reduction of microorganisms in water are not as effective in reducing the amount of enteric viruses.

The publication "Inactivation of enteric microorganisms with chemical disinfectants, UV irradiation and combined chemical/UV treatments" by J. Koivunen and H Heinonen-Tanski, Water Research 39 (2005) 1519-1526 discloses disinfection efficiencies between peracetic acid (PAA), hydrogen peroxide and sodium hypochlorite. Evaluation of synergistic effects with combined use of UV is also disclosed. However, combined PAA/UV disinfection did not achieve any significant synergistic effects compared to only using PAA. Peracetic acid (PAA) is an effective disinfectant against enteric bacteria, but not as effective against viruses, bacterial spores and protozoan cysts. Only by using high doses, e.g. 7-15 mg/l, of PAA can MS2 be inactivated (1-1.5 log reduction). PAA in combination with UV-irradiation has shown to be effective against enteric bacteria, but no synergistic effect is seen in the reduction of the amount of MS2, compared to PAA-treatment alone.

Micropollutants are pollutants which exists in very small concentrations in water. In natural waters, aquatic organisms are exposed to numerous inorganic and organic micropollutants (defined as synthetic and natural trace contaminants present in water at low to very low concentrations, from ng/liter to µg/liter). Organic micropollutants, which are almost exclusively man-made, are also present in natural waters. Their sources are diverse, from discharge of wastewaters and industrial installations to pesticide runoff water from agricultural lands. Aquatic organisms may thus be exposed to a mixture of numerous contaminants originating from industrial, agricultural and domestic activities. In addition, these micropollutants will not usually be removed in conventional raw water treatment processes and will hence be present in e.g. drinking water. There is an increasing amount of various organic micropollutants entering the environment. Endorcine-disrupting compounds (EDCs) are of particular concern as these trace contaminants have potential to interfere with hormonal system of living organisms. Therefore, if not removed or decomposed to a required level, these micropollutants can affect development, reproduction and fertility as well as cause other harmful effects. Among suspected EDCs are micropollutants originating from the pharmaceuticals, pesticides, personal care products, fire retardants as well as some naturally occurring compounds such as hormones.

Conventional treatment methods can remove some load of organic micropollutants, however, advanced methods are needed to remove recalcitrant micropollutants and to improve the level of decomposition. More environmentally friendly alternatives should be utilized as much as possible for these purposes. Moreover, the treatment steps and amount of additives, needed for the tertiary water treatment, should be minimized to ensure the cost-effectiveness of whole treatment system.

There still exist a need for improvement of the reduction of microorganisms like enteric viruses, and/or decomposition of organic micropollutants but also reducing the amount of additives needed in water treatments and using more environmentally friendly alternatives.

SUMMARY

An object of the present invention is to provide a process for treating water comprising microorganisms and/or organic micropollutants using an energy source and an additive characterised in that the energy source is UV radiation and the additive comprises performic acid.

Another object of the present invention is to reduce the amounts of chemical additives and/or providing more environmentally friendly chemicals in the disinfection of water.

A further object of the present invention is to reduce fouling of UV lamps used in the process according to the present invention.

The present invention relates to a process for treatment of water comprising microorganisms and/or micropollutants using an energy source and an additive. The energy source is UV-radiation and the additive comprises performic acid (PFA). By combining PFA and UV-radiation a higher reduction of bacteria and/or viruses, and/or higher decomposition of organic micropollutants can be achieved compared to currently used processes and also compared to using only PFA or only UV-radiation. Thus, the combination achieves an effect which can be additive or synergistic. Existing plants for water disinfection can readily be adapted to implement the current invention.

According to one embodiment the process is for reduction of the presence of microorganisms and/or decomposition of micropollutants.

According to one embodiment the microorganisms may be bacteria and/or viruses.

According to one embodiment the bacteria and/or viruses are enteric bacteria and/or viruses.

According to one embodiment the bacteria are selected from *Escherichia coli, Enterococcus faecalis* and *Enterococcus faecium*.

According to one embodiment the viruses are bacteriophages.

According to one embodiment the bacteriophage is MS2.

According to one embodiment the organic micropollutants are selected from pesticides, pharmaceutical residues, hormones, flame retardants, plasticizers and perfluorinated compounds, or any combination thereof.

According to one embodiment the organic micropollutants may be selected from the group atrazine, lindane, carbamazepine, diclofenac, sulfamethoxazole, gemfibrozil, ethenylestradiol, oxybenzone, and musk ketone, or any combination thereof.

According to one embodiment the water to be treated is subjected to UV radiation during and/or after the addition of the additive containing performic acid to the water.

According to one embodiment the performic acid is added to the waters to be disinfected and/or subjected to degradation in an amount of 0.1 to 50 mg/l.

According to one embodiment the performic acid is mainly added to the waters to be disinfected and/or subjected to degradation in an amount of 5 to 50 mg/l, and preferably 10-25 mg/l.

According to one embodiment the performic acid is mainly added to the waters to be disinfected and/or subjected to degradation in an amount of 0.1 to 5 mg/l, preferably 0.2-4 mg/l, preferably 0.3-2 mg/l, and preferably 0.4-1 mg/l.

According to one embodiment the addition of performic acid intermittently is performed as an instantaneous chock dosing in an amount of 5 to 50 mg/l.

The present invention also relates to the use of an energy source and an additive for treating water, preferably for degradation of micropollutants and/or reduction of the presence of microorganisms in said water, characterised in that the energy source is UV radiation and the additive comprises performic acid.

The present invention relates to a process for the degradation of micropollutants and/or reduction of the presence of microorganisms in water using an energy source and an additive. The energy source is UV-radiation and the additive comprises performic acid (PFA). Organic micropollutants may be selected from pesticides, pharmaceutical residues, hormones, flame retardants, personal care products, plasticizers and perfluorinated compounds, or any combination thereof. Examples may be residues from birth control pills, antibiotics, or analgesics. To exemplify some compounds, the organic micropollutants may be selected from the group atrazine, lindane, carbamazepine, diclofenac, sulfamethoxazole, gemfibrozil, ethenylestradiol, oxybenzone, and musk ketone, or any combination thereof. Microorganisms influenced by the present method may be bacteria and/or viruses. Among viruses bacteriophages, such as MS2, may be of interest to remove with the present method. According to one embodiment the present method is directed to eliminate enteric bacteria such as *Escherichia coli, Enterococcus faecalis* and *Enterococcus faecium* and/or enteric viruses. By combining PFA and UV-radiation a better and more complete degradation of organic micropollutants and/or higher reduction of bacteria and viruses can be achieved compared to current processes and also compared to using only acid or only UV-radiation. Thus, the combination achieves an effect which can be additive or synergistic. Existing plants for water disinfection and/or degradation of organic micropollutants can readily be adapted to implement the current invention.

In another embodiment of the present invention the water to be treated is subjected to UV radiation during and/or after the addition of the additive containing PFA to the water.

In still another embodiment the PFA is added to the waters to be treated in an amount of 0.1 to 5 mg/l, preferably 0.2-4 mg/l, preferably 0.3-2 mg/l, and preferably 0.4-1 mg/l; or 5 to 50 mg/l, and preferably 10-25 mg/l.

In a further embodiment the addition of PFA is intermittently performed as an instantaneous chock dosing in an amount of 5 to 50 mg/l.

The present invention also relates to use of an energy source and an additive for reduction of the presence of microorganisms in water wherein the energy source is UV radiation and the additive comprises performic acid.

The waters to be treated may be waste waters, e.g. secondary treated waste waters.

DETAILED DESCRIPTION OF EXEMPLARY EMBODIMENTS

In the present application the wording "microorganisms" includes bacteria, viruses, fungi, protest, archaea, and prions.

In the present application the wording "micropollutants" includes organic micropollutants such as pesticides, pharmaceutical residues, hormones, flame-retardants, plasticizers, perfluorinated compounds, and others.

In the present application the wording "pharmaceutical residues" is to be interpreted as including left-over pharmaceuticals, not decomposed pharmaceuticals, and partly decomposed pharmaceuticals.

*Escherichia*, especially *E. coli*, and *Enterococci*, especially *E. faecalis* and *E. faecium*, are common indicator bacteria used in water quality testing and MS2 bacteriophage is a common surrogate for enteric viruses which could potentially contaminate field water samples.

*Escherichia coli* bacteria are of the family Enterobacteriaceae and are the main indicator bacteria used in water purity tests. The presence of *E. coli* signifies that the water may be contaminated with human or animal fecal waste and thus serves as an indicator that other potentially harmful bacteria or viruses may be present. *E. coli* is most commonly used in water-testing because it's response to ultraviolet radiation has been well-characterized.

*Enterococcus* is a genus of lactic acid bacteria of the phylum Firmicutes. *Enterococci* are Gram-positive cocci that often occur in pairs (diplococci) or short chains. Two species are common commensal organisms in the intestines of humans: *E. faecalis* and *E. faecium*. In water, the acceptable level of contamination of these bacteria is very low. The level of *Enterococcus* spp. is used as standard for water quality control within some areas.

MS2 bacteriophage is of the family Leviviridae and has positive single stranded RNA and has the same shape and size as enteric viruses. It typically infects *Bacillus subtilis*, but is commonly propagated in *Escherichia Coli* in the laboratory setting. MS2 is a very common surrogate for enteroviruses that infect water supplies, as it has been demonstrated that the phage responds similarly to UV light treatment. MS2's similarity in UV inactivation, coupled with its ease and safety of propagation in the laboratory setting makes it the perfect surrogate organism for UV testing. In fact, the EPA actually defines MS2 as "a non-pathogenic bacteriophage commonly used as a challenge organism in UV reactor validation testing".

According to the present method, PFA is added to the waters to be treated in an amount of 0.1 to 50 mg PFA per liter water to be treated. To be able to decompose micropollutants and/or disinfect the waters an amount of 0.1 to 50 mg PFA per liter water should preferably be added. E.g. micropollutants in the waters may be decomposed using an amount of 5-50 mg/l, and preferably 10-25 mg/l PFA per liter water. E.g. the waters may be disinfected using an amount of 0.1-5 mg/l, preferably 0.2-4 mg/l, preferably 0.3-2 mg/l, and preferably 0.4-1 mg/l PFA per liter water.

However, due to the organic material and/or microorganisms present in the process the efficiency of the UV lamp may be reduced due to fouling, specifically at the position of the apparatus where the UV lamp is radiating the waters. By intermittently increasing the dosage of PFA the process is run without reduced UV effect due to fouling. The process runs with a continuous addition of PFA. The continuous addition of PFA is mainly kept at an amount of 0.1 to 5 mg PFA per liter water but intermittently an increased dose, a chock dose, of PFA is instantaneously added to the waters. Before and after each addition of a chock dose of PFA, the addition of PFA is maintained in an amount of 0.1-5 mg/l. The reduction of the fouling of the apparatus at the UV lamp is performed by instantaneous chock dosing using PFA amounts at the higher end of the above disclosed range, e.g. 5-50 mg/l, 10-50 mg/l or 15-40 mg/l. Depending on the intensity of fouling on the UV lamp surfaces, a weekly sum of shock dosage periods is between 0.3-30 h. The shock dosage may be applied using different sequences, like short dosages applied often or long dosages applied less frequently. In one embodiment the shock dosage is applied 1-3 times a week, in another embodiment every 6 hours. The PFA containing additive may be an equilibrium solution of PFA. A typical way to prepare equilibrium solutions of PFA is to mix formic acid with hydrogen peroxide. A catalyst may be used, for example mineral acids, such as sulfuric acid. PFA is added to the water and allowed to react. The water to be disinfected and subjected to organic degradation is subjected to UV-radiation during and/or after the addition of PFA to the water. The reaction time for PFA is not limited but typically it is up to 60 minutes, preferably 1 to 30 min, preferably 2-10 minutes. PFA degrades within a few hours and the final degradation products after entering the recipient is water and carbon dioxide. Hence, PFA has low negative effects on the environment.

Combining PFA-treatment with UV-radiation is more effective in reducing the amounts of MS2 (the surrogate test organism for enteric viruses) than these disinfectants used alone and separately. An explanation for this may be free radicals produced by photolysis of PFA. Also, by combining PFA-treatment with UV-radiation the degradation of organic micropollutants is more effective in reducing the amounts of e.g. pharmaceutical residues than these degrading components used alone and separately.

Fecal coliforms are a group of bacteria species (mainly *Eschericha*) present in the intestinal tract and feces of warm-blooded animals and humans. The presence of these bacteria in water indicates the presence of human or animal waste and that pathogens (disease-causing organisms) may be in the water system.

Combining PFA-treatment with UV-radiation is also more effective in reducing the amounts of *E. coli* and *Enterococci* than these disinfectants used alone and separately. Combining PFA-treatment with UV-radiation is also more effective in decomposition of atrazine, lindane, carbamazepine, diclofenac, sulfamethoxazole, gemfibrozil, ethenylestradiol, oxybenzone, musk ketone present in waters to be treated, than said degrading components used alone and separately.

The UV-radiation dose is below 200 $mJ/cm^2$, typically 5-200 $mJ/cm^2$. The UV-radiation dose may for decomposition of micropollutants be in a range of 5-200 $mJ/cm^2$, e.g. 50-180 or 70-150 $mJ/cm^2$. The UV-radiation dose may for reduction of microorganisms be in a range of 5-200 $mJ/cm^2$, e.g. 5-50 $mJ/cm^2$, and preferably 10-30 $mJ/cm^2$. The dose is determined by the intensity of the UV-radiation and by its duration.

The wavelength of the UV-radiation is 180-320 nm, preferably 200-290 nm.

The water to be treated is for example waste water, cooling water, process water or drinking water.

EXAMPLES

Example 1

The source of performic acid used in the tests was DEX-135® (Kemira, equilibrium solution with 13.5 w/v-% PFA (13.5 g PFA/100 ml)).

Freshly prepared DEX-135® was added to wastewater effluent (500 ml) that was spiked with RNA coliphages (MS2) to contain 38534 PFU/ml MS2 and mixed continuously with a magnetic stirrer. The PFA was quenched after 10 minutes contact time by adding 500 µl 10% $Na_2S_2O_3$ (Merck), and 5 µl catalase (Sigma Catalase) to this 500 ml PFA treated effluents. The tested concentrations of PFA in the effluent were from 0.5 up to 7 ppm.

UV disinfection using collimator device: The test was done with 50 ml of wastewater effluent The waters were taken in to the cylinders and that was spiked with RNA coliphages (MS2) to contain 38534 PFU/ml MS2 and mixed. 10 ml of this water was taken in to the Petri dishes (diameter 6 cm) and exposed to UV using collimated beam (intensity I0 on the surface of water 0.22 mWs/cm$^2$) with continue mixing with magnet stirrer. The UV exposed time was 0.5, 1 and 2 minutes corresponding the UV doses 6.6, 13.2 and 26.4 mWs/cm$^2$. The wavelength was 253.7 nm.

PFA+UV disinfection experiment: Wastewater effluent that was spiked with RNA coliphages (MS2) to contain 38534 PFU/ml MS2 and mixed was first treated by PFA as a dose of 0.75 mg/l wastewater sample. After 4 minutes contact time this PFA treated wastewater was flowed through the UV radiation collimator device with specific flow rate so the UV dose was 21.5 mWs/cm$^2$. The wastewater sample for microbial analysis was taken at 9 minutes after PFA treatment (i.e. prior to UV treatment) and just after UV treatment at total 10 minutes contact time of PFA treatment. The residual PFA was quenched as done in performic acid experimental tests.

Determination of microorganisms: The microbiological analyses were started within a few minutes after disinfection segment of the experiment. MS2 coliphages were determined on phage TYG-agar by basing on old double-agar-layer-method (Adams, 1959), with *Escherichia coli* ATCC 15597 and 13706, respectively as host bacteria and overnight incubation at 37° C. After incubation, virus plaques were counted and results calculated as PFU/ml (PFU=Plaque Forming Unit) and reduction percentage were also determined. The determination methods for coliphages used are according to ISO 10705-2 (for somatic coliphages).

The combination of UV and PFA as well as the effect of the two treatments alone where tested against MS2 coliphages. The required dose for 90%/(1 log) removal was calculated and is presented in Table 1. The synergistic index was calculated by the method presented by F. C. Kull et al., Applied Microbiology, vol. 9 (1961), p. 538. Here, the synergistic index was calculated using the following formula:

Synergistic index SI=$Qa/QA+Qb/QB$.

When applying this formula to the biocide system tested in the present context, the parameters in the formula have the following meanings: For example, at 1 log reduction:
Qa=Concentration of biocide A in biocide mixture
QA=concentration of A as the only biocide
Qb=Concentration of biocide B in biocide mixture
QB=concentration of B as the only biocide.

Synergistic index was calculated for 1 log reduction. In all calculations either Qa (PFA dose) or Qb (UV dose) is chosen from the used ones in the study and the other is calculated from the linear adjustment of the data points.

The calculated synergy index (SI) using these results is 1 (=additive effect). This indicates that the combination effect of UV and PFA is at least additive and close to synergistic.

TABLE 1

Comparison of the PFA and UV results in effluent wastewater for 1 log reduction of MS2.

| microbes | PFA (mg/l) | UV (mWs/cm$^2$) | PFA mg/l + UV mWs/cm$^2$ |
|---|---|---|---|
| MS2 | 3.5 | 27.2 | 0.75 + 21.5 |

Example 2

Since the wastewater effluent might contain less than 100 cfu/ml (10$^4$ cfu/100 ml) of *E. coli* and *Enterococci* these microorganisms were spiked to wastewater so that the numbers of these microorganisms would be at the level of 10$^4$-10$^5$ cfu/ml allowing to study better reduction. *E. coli* ATTC 15597 and *Enterococcus faecalis* ATCC 29212 were produced in tryptone yeast extract broth as overnight shaker cultures at 37° C. and kept at 4° C. during the experiment. The numbers of *E. coli* and *Enterococci* (containing thus both the natural and spiked ones) were enumerated from effluent and effluent after disinfections by using Chromocult agar (Merck) and confirmed by indole production for *E. coli* and Slanetz-Bartley agar (Labema) for *Enterococci* incubated at 37° C. for 1 and 2 days, respectively.

The fresh spiked wastewater effluent was treated with fresh DEX-135® as concentrations of PFA 0.25 mg/l, 0.5 mg/l, and 1.0 mg/l in wastewater so that the contact time under mixing were 10 minutes and the reaction will be stopped with 1 ml 10% Na$_2$S$_2$O$_3$ and 10 µl catalase (Sigma) for 1 L reaction mixture. The enumerations of *E. coli* and *Enterococci* were done as for fresh wastewater keeping the mixture at 4° C. for less than 5 hours before starting the analysis.

Only UV-irradiation: The spiked wastewater effluent was mixed and treated in a collimator device (UV intensity of 0.22 mW/cm$^2$ on surface of the solution) to treat UV-irradiations using UV 15 mWs/cm$^2$ alone, UV 25 mWs/cm$^2$ alone and UV 50 mWs/cm$^2$ alone. The enumerations of *E. coli* and *Enterococci* were determined as previously.

Combined tests with PFA and UV: The spiked wastewater effluent was treated with PFA so that its concentrations were 0.25 and 0.5 and 1.0 mg/l and the UV-irradiations were 15, 25 and 50 mWs/cm$^2$ as all three times three combinations of PFA and UV. The effect of only PFA was first for 60 seconds and then the UV-irradiation was started by switching the lamp on and after desired the irradiation doses the lamp was switched off and the total PFA treatment time was continued up to 10 minutes and quenched then as PFA treatment.

*E. coli* and *Enterococci* were analyzed by the spread-plate-technique. *E. coli* were cultivated on Chromocult agar (Merck, KGaA, Germany) and incubated at 37° C. for 21+3 h (preferring 2 days) and *Enterococci* on Slanez & Bartley agar (Lab M, IDG plc, Bury, Lancashire, UK) and incubated at 37° C. for 48+3 h. *E. coli* were confirmed by oxidase. Bacterial numbers were calculated as CFU/ml (CFU=Colony Forming Unit) and reductions were also determined. These bacterial determination methods are describes in ISO-9308-1 (*E. coli*) and SFS-EN ISO 7899-2 (*Enterococci*).

Effect on *E. coli* with the combined treatment of UV and PFA can be seen in the Table 2 and effect on *Enterococci* in the table 3. A combination of PFA and UV gives a higher reduction of *E. coli* and *Enterococci* then the individual treatments alone. It's also obvious that substantial savings in UV energy can be done.

TABLE 2

The effect of the treatments on E-coli

| Treatment | Log reduction |
|---|---|
| UV 25 mWs/cm$^2$ | 1.72 |
| PFA 0.25 mg/l | 1.72 |

TABLE 2-continued

The effect of the treatments on E-coli

| Treatment | Log reduction |
|---|---|
| PFA 0.25 mg/l + UV 25 mWs/cm² | 3.52 |

TABLE 3

The effect of the treatments on Enterococci

| Treatment | Log reduction |
|---|---|
| UV 15 mWs/cm² | 1.12 |
| PFA 0.25 mg/l | 3.08 |
| PFA 0.25 mg/l + UV 15 mWs/cm² | 4.53 |

Example 3

Additive and synergistic effects were calculated from the results of the treatments in the example 2. The graphs of Log reduction vs. dose were made and the values below were interpolated from the linear function of the data points. By combining UV and PFA interpolated doses, additive and synergistic effects can be seen. As example, a combination of 0.06 mg/l of PFA and a UV dose of 15 mWs/cm² shows a synergistic effect. To get the same reduction of E. coli by the individual treatments alone, 0.33 mg/l PFA respectively 21.5 mWs/cm² UV is needed. The synergy index (SI) is 0.88, indicating a synergy. The combination of 0.22 mg/l PFA and 15 mWs/cm² UV gives a SI of 1, which means an additive effect. The results can be seen in Table 4.

TABLE 4

SI values in E.coli experiment

| Log reduction | 1.5 | 2 |
|---|---|---|
| PFA alone mg/l ($Q_A$) | 0.33 | 0.44 |
| UV alone ($Q_B$) | 21.46 | 28.61 |
| PFA mg/l in combination with UV ($Q_a$) | 0.06 | 0.22 |
| UV in combination with PFA ($Q_b$) | 15 | 15 |
| SI | 0.88 | 1.02 |

Another example shows results for *Enterococci*. The combinations 0.03 mg/l PFA and UV 15 mWS/cm², 0.19 mg/l PFA and UV 15 mWs/cm² and 0.35 mg/l PFA and UV 15 mWs/cm² all shows synergistic effects, while the combination 0.52 mg/l PFA and UV 15 mWs/cm² shows additive effect. The results can be seen in Table 5.

TABLE 5

SI values in Enterococci experiment

| Studied Log reduction | 2.5 | 3 | 3.5 | 4 |
|---|---|---|---|---|
| PFA alone mg/l ($Q_A$) | 0.47 | 0.56 | 0.66 | 0.75 |
| UV alone ($Q_B$) | 28.84 | 34.60 | 40.37 | 46.14 |
| PFA mg/l in combination with UV ($Q_a$) | 0.03 | 0.19 | 0.35 | 0.52 |
| UV in combination with PFA ($Q_b$) | 15 | 15 | 15 | 15 |
| SI | 0.57 | 0.77 | 0.93 | 1.01 |

Example 4

In a laboratory batch reactor, 1100 ml secondary waste water from Suomenoja waste water treatment plant spiked with atrazine, lindane, carbamazepine, diclofenac, gemfibrozil, ethenylestradiol, oxybenzone, and musk ketone, 5 μg/l each, was treated with different concentrations of PFA (0 to 25 mg/l) and varying UV (88 mJ/cm²) radiation times (0 to 15 min). The total reaction time was always kept in 15 min and the treatment temperature was between 10-15° C. The concentrations of each micropollutant were analyzed before and after treatment, and the difference was used to calculate the conversion of each compound. Further, a mean value of the conversions (%) of those 8 compounds was calculated to describe the overall efficiency of the treatment. A summary of the experimental results is shown in the Table 6.

TABLE 6

Average conversion (%) of 8 compounds

| PFA (mg/l) | UV (min) | average conversion (%) |
|---|---|---|
| 25 | 15 | 66.78 |
| 25 | 5 | 41.61 |
| 25 | 1 | 16.64 |
| 25 | 0 | 8.98 |
| 12.5 | 15 | 54.18 |
| 12.5 | 5 | 36.25 |
| 12.5 | 1 | 19.25 |
| 12.5 | 0 | 5.15 |
| 5 | 15 | 47.86 |
| 5 | 5 | 28.53 |
| 5 | 1 | 15.27 |
| 5 | 0 | 1.66 |
| 0 | 15 | 39.92 |
| 0 | 5 | 26.64 |
| 0 | 1 | 15.18 |
| 0 | 0 | 3.78 |

From the Table 6 it can be seen that the treatment efficiency increases with both increasing PFA dose and with increasing UV radiation time. In addition, from the Table 6 it is evident that the combination of PFA and UV shows a synergetic effect in micropollutant decomposition.

The invention claimed is:

1. A process for treating water comprising organic micropollutants and/or microorganisms comprising:
    treating the water using an energy source and adding to the water an additive, wherein the energy source is UV radiation and the additive comprises performic acid, wherein the water to be treated is subjected to UV radiation during continuous addition of the additive containing performic acid to the water and the performic acid is added to the waters to be disinfected and/or subjected to degradation in an amount of 0.1 to 5 mg/l and intermittent instantaneous shock dosing using performic acid in an amount of 10 to 50 mg/l is performed and a weekly sum of the shock dosage periods performed is 0.3-30 h.

2. The process according to claim 1, wherein the organic micropollutants are selected from the group consisting of pesticides, pharmaceutical residues, hormones, flame-retardants, plasticizers and perfluorinated compounds, and any combination thereof.

3. The process according to claim 1, wherein the organic micropollutants are selected from the group consisting of atrazine, lindane, carbamazepine, diclofenac, sulfamethoxazole, gemfibrozil, ethenylestradiol, oxybenzone, and musk ketone, and any combination thereof.

4. The process according to claim 1, wherein the microorganisms are bacteria and/or viruses.

5. The process according to claim 4, wherein bacteria and/or viruses are enteric bacteria and/or viruses.

6. The process according to claim 5, wherein the bacteria are selected from *Escherichia coli, Enterococcus faecalis* and *Enterococcus faecium.*

7. The process according to claim 4, wherein the viruses are bacteriophages.

8. The process according to claim 7, wherein the bacteriophage is MS2.

* * * * *